Aug. 12, 1952     R. E. L. TRUBERT     2,606,995
ELECTRIC RESISTANCE HEATING DEVICE FOR LIQUIDS
Filed May 20, 1950
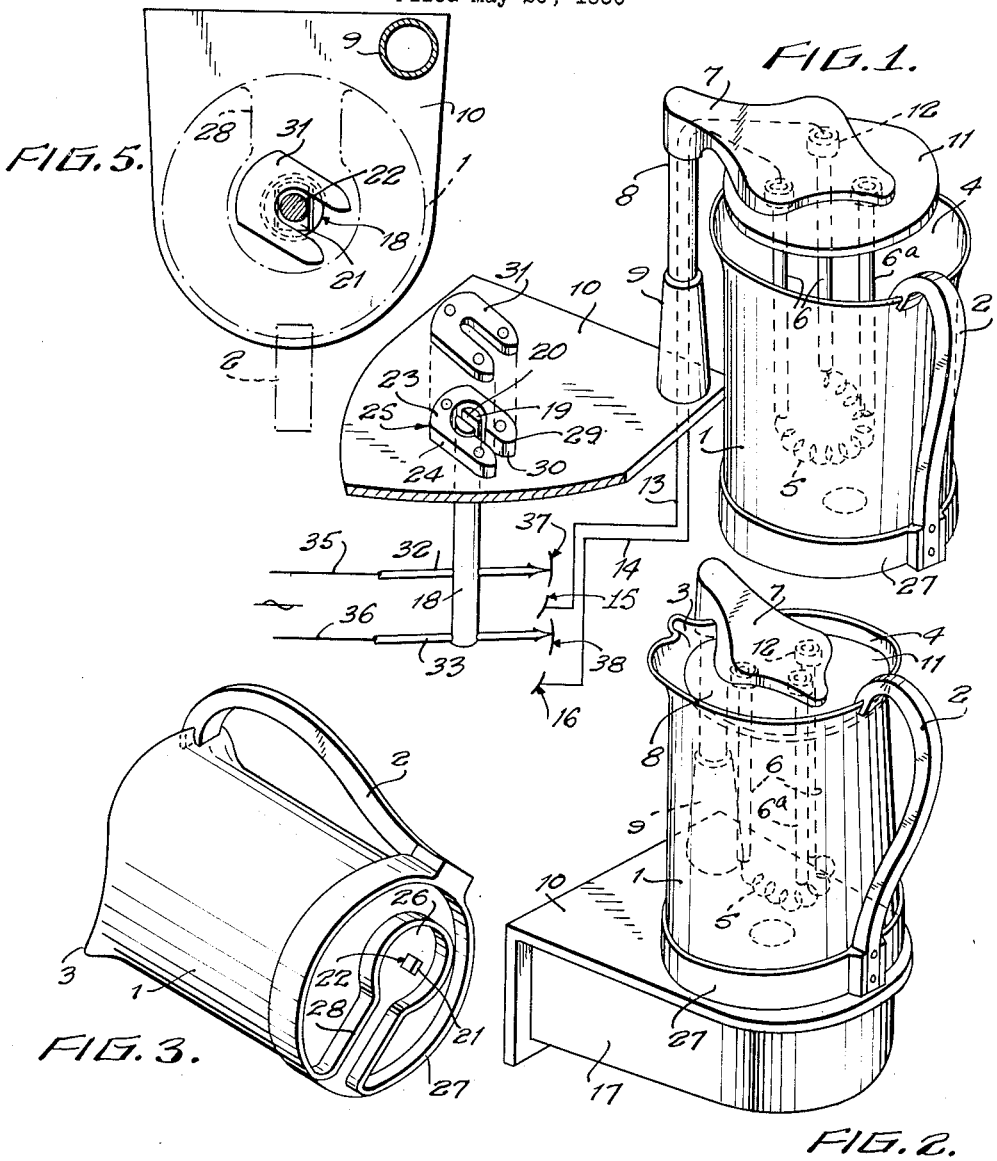
INVENTOR.
Rene Eugene Leon Trubert Patented Aug. 12, 1952

2,606,995

UNITED STATES PATENT OFFICE 2,606,995

ELECTRIC RESISTANCE HEATING DEVICE FOR LIQUIDS

René Eugène Léon Trubert, Viroflay, France

Application May 20, 1950, Serial No. 163,110
In France May 23, 1949

5 Claims. (Cl. 219—43)

The present invention relates to electric resistance heating devices for liquids, more especially for water.

While the device of the present invention may be used anywhere provided suitable current is available it is of special interest for kitchens and toilet rooms, and is particularly suitable for use with electric kitchens which do not otherwise always provide for the quick heating of relatively small quantities of water. In many cases it is desirable to heat a small quantity of water quickly, for example in the preparation of hot drink, and the present invention is especially applicable for such purposes.

It is an object of the invention to enable water to be heated not only quickly but also economically and to minimise the risks which are sometimes attendant upon the use of electric heating devices.

According to the present invention a swivelling bracket supporting a resistance heater therebeneath is mounted on or adjacent to a platform adapted to receive a portable open-mouthed water container, and the platform is provided with an electric switch operated by the container to switch the heater on and to cause the heater to be switched off before or while the container is removed from the platform, the swivel arrangement of the bracket enabling it to be moved to a position overhanging the edge of the platform to enable the container to be raised towards the bracket so as to plunge the heater into the contents of the container, whereupon the container with the heater therein can be moved to a position on the platform, with incidental swivelling of the bracket, to cause the electric switch to energise the heater.

According to another aspect of the invention an electric resistance heating device for liquids, more especially for water, comprises a platform, a portable open-ended water container adapted to be supported by the platform, a switch embodied in the platform and adapted to be switched on and off by the container, a swivel bracket arranged at a level above the platform and adapted to be swung from a position above the platform to a position overhanging the edge of the platform and an electric heating resistance beneath the bracket and supported therefrom, whereby the container with liquid therein can be raised towards the bracket to cause the resistance to plunge into the liquid whereupon the container with the heating resistance therein can be moved on to the platform and the current switched on by the container to energise the heater.

The container is preferably formed of an electric insulating material and the bracket formed of a like material and adapted to serve as a lid for the container or fitted with an element adapted to serve as such. The electric heating resistance may be supported beneath the bracket by stems of insulating material depending from the bracket and with the object of achieving quick heating the heating resistance is preferably unsheathed, i. e. naked.

Means are preferably provided for locking the container to the platform as the switch is actuated by the container to energise the heating element so that the current is necessarily switched off from the heating element before the container is withdrawn from the platform and from the heating element.

The switch may be actuated by angular displacement of the container about an approximately vertical axis after it has been placed on the platform and guide means may be provided for locating the container on the platform in a position appropriate for actuating the switch.

In a preferred form of device the container has a flat sided key depending from its base for engagement in a slot at the upper end of an angularly displaceable switch spindle projecting upwardly from the platform and the upper end or stem of the key is reduced in width to enable it to slide into a slot of a U-shaped guard plate on the platform, which guard plate prevents the container from being raised after angular displacement thereof to cause the key to engage beneath the guard plate.

Moreover, in the preferred form of device the guard plate is longer than it is wide and is secured on a longitudinally slotted block of corresponding U-shape extending around the upper end of the switch spindle whilst the base of the container embodies a parallel guide adapted to receive the block to enable the container to be guided thereby, which parallel guide merges into a more or less circular enclosure or wall in the base of the container adapted to prevent linear displacement of the container on the platform after the container has been angularly displaced to actuate the switch and to move the guide out of alignment with the block and guard plate.

The bracket may be supported by an upstanding column which engages at its lower end in a swivel bearing or pedestal on the platform. The switch may be enclosed in a casing and the electrical connections may run from the casing to the heating resistance through said column.

It will be appreciated that the present invention provides a relatively simple and economical device for the heating of relatively small quantities of water such for example as a jugful of water at a time. The use of a naked resistance heating element enables the water to be heated quickly whilst the danger of burning or electrocution is minimised by virtue of the fact that during the heating operation the naked resistance is plunged into the contents of the container or pot which, in order to switch on the current to the heating element, is necessarily locked to the platform and which before being released from the platform must be turned into a position in which the current is switched off.

If desired, the height of the bracket above the platform may be adjustable.

The invention is further described with reference to the accompanying drawings which show one form of construction by way of example and in which:

Fig. 1 is a perspective view of the device in the position when the pot has just been lifted to plunge the heating resistance into its contents, the switch being diagrammatically shown beneath the platform, Fig. 2 is a perspective view of the device showing the pot on the platform while the contents are being heated, Fig. 3 is a perspective view showing the underside of the pot, Fig. 4 is a diagrammatic view illustrating the relationship between the pot, the platform and the switch prior to the switching on of the current to the heating resistance, and Fig. 5 is a diagrammatic view corresponding to Fig. 4 showing the relationship of the parts after the current has been switched on.

In the example shown, a portable water container or pot 1, of insulating material is of general cylindrical shape with a bow-shaped handle 2 on one side and a spout 3 opposite on its open upper rim 4 which is preferably bell-mouthed upwardly.

A heating element 5 consisting of an electric resistance, for example of bare nickel chrome, is supported by vertical stems, comprising, in the example shown, two stems 6 for the passage of the current, and one auxiliary stem 6a serving only for support. These stems 6 and 6a are suspended from a swivelling bracket 7 supported by a vertical tubular column 8 capable of being pivoted in a fixed pedestal or bearing 9 borne by the horizontal platform 10 which may be constructed in the form of a bracket and fixed to a wall, for example, above an oven. Beneath the bracket 10 is fixed an insulating plate 11 which carries terminals 12 which receive the stems 6 of the heating element. The plate 11 forms a lid for the pot and can be entered with slight clearance into the mouth of the pot.

The stems 6 are coupled respectively by wire conductors 13, 14 with fixed contacts 15, 16 of an electric switch disposed beneath the platform 10, for example in the interior of a casing 17 which contains the various connections; the conducting wires 13 and 14 may pass to the inside of the column 8 and of the pedestal 9. The movable parts of the switch are carried by a vertical spindle 18, the upper end 19 of which extends above the platform 10 and carries a diametrical slot 20 to receive a corresponding driving key 21 secured to the underside of the bottom of the pot by a narrow stem 22.

Around the end 19 of the spindle 18, the platform 10 carries a guide block 23 of approximately U-shape and longer than it is wide, the outer lateral faces 24, 25 of the two branches of this block being flat, vertical and parallel and spaced apart by the width of the block 23. The two branches of the block 23 approach each other towards their ends to form, between them, a passage for the key 21 when the pot is caused to slide horizontally on the platform 11 in such manner as to cause the key to enter the slot 20 which, in the inoperative positon of the switch, is orientated parallel to the branches of the block 23 and to the flat faces 24, 25 as shown in Fig. 1. The key 21 is disposed at the centre of a circular wall or enclosure 26 provided in the base 27 of the pot and this enclosure 26 communicates with a radial passage 28 whose width corresponds to that of the block 23. The ends of the branches of the block 23 are chamfered as at 29, 30 to facilitate the entry of the block 23 into the passage 28 and the entry of the key 21 between the two branches of the block 23.

On the block 23 is secured a guard-plate 31 of shape corresponding to that of the block 23 but the spacing between the branches is less and permits only of the passage of the stem 22 of the key 21 which is narrower than the body of the key. This guard-plate prevents actuation of the switch with the aid of an ordinary screw driver, and prevents lifting of the pot from the platform when the key 21 is turned to actuate the switch since the key 21 is then retained under the plate 31. The ends of the branches of the plate 31 are chamfered correspondingly to the chamfers 29—30 of the block 23.

In the example shown the switch is a two-way switch and its spindle 18 carries moving contacts 32, 33 which receive current through the wires 35, 36 and are adapted to engage respectively either fixed contacts 15, 16, feeding the heating element of the water pot or other fixed contacts 37, 38 feeding other heating elements. In the inoperative position of the switch (i. e. when the water pot is not in use) the movable contacts 32, 33 engage respectively the contacts 37, 38. Thus in the inoperative position of the switch it feeds current to the other heating elements, while the circuit of the heating element of the water pot of the present invention is open. If the spindle 18 turns through an appropriate angle, the movable contacts 32, 33 leave the contacts 37, 38 interrupting the feed to the other heating appliances, and engage the contacts 15, 16 feeding the heating element 5.

The apparatus is used as follows. The bracket 7 being in the position shown in Fig. 1 overhanging the edge of the platform, the pot 1 filled with cold water and is placed under the element 5 to one side of the table 10. The pot 1 is then raised, causing the resistance 5 to plunge into the water in the pot, until the base 27 of the pot is at the level of the table 10, the lid 11 being then entered into the upper end 4 of the pot. The pot is then slid into the table while orientating the spout 3 in the longitudinal direction of the block 23, in such manner that the latter is moved through the passage 28 and into the enclosure 26, the key 21 having then entered the slot 20 (Fig. 4). The pot is then turned (i. e. angularly displaced) round the piece 23 (Fig. 5), which action draws the spindle 18 of the switch into position for feeding the heating element as already explained (Figs. 2 and 5).

When the water is sufficiently warm or when it boils, the pot is withdrawn by reversing the procedure, first causing it to pass from the position shown in Fig. 5 to that of Fig. 4, thus interrupting the electric supply, then in sliding it parallel to the length of the block 23, causing the bracket 7, in consequence, to turn outwards from the table around the axis of the pedestal 9 and finally lowering the pot to withdraw it from the heating element. After using the water, the pot may be refilled and replaced on the table, when it will suffice to turn the pot at the desired moment to switch on the current and heat up the contained water.

It will be understood that the invention is by no means limited to the particular form of construction shown in the drawings and various modifications may be devised without departing from the spirit of the invention. For example, the heating element may be fed by a double wire circuit or by a three wire circuit. Again the heating element may embody two or more resistance elements which could be switched on selectively.

I claim:

1. An electric heating device for liquids, comprising in combination, a supporting platform; a portable container open on top and consisting of an electrically insulating material, said container having a bottom plate; a key means downwardly projecting from said bottom plate; a swivel bracket mounted on said supporting platform; an electric heating element downwardly projecting from said swivel bracket, said bracket being arranged at a level above said platform turnably from a position above the platform to a position projecting over the edge of said platform at which latter position said container may be raised toward said bracket so as to receive said heating element into the interior of said container whereupon said container with said heating element therein may be moved with a swivelling motion of said bracket onto said platform; switch means secured to said platform and including a switch spindle having an upper end portion formed with a slot and projecting through a hole in said supporting platform, said slot engaging said key means when said container is placed on said platform, said switch means adapted to connect and disconnect, respectively, said heating element when said switch spindle is turned by angular displacement of said container while said key means engage said slot; and guide means guiding said container on said platform to a position in which said key means engage said slot in said switch spindle.

2. An electric heating device for liquids, comprising, in combination, a supporting platform; a portable container open on top and consisting of an electrically insulating material, said container having a bottom plate; a key means downwardly projecting from said bottom plate; a swivel bracket mounted on said supporting platform; an electric heating element downwardly projecting from said swivel bracket, said bracket being arranged at a level above said platform turnably from a position above the platform to a position projecting over the edge of said platform at which latter position said container may be raised toward said bracket so as to receive said heating element into the interior of said container whereupon said container with said heating element therein may be moved with a swivelling motion of said bracket onto said platform; switch means secured to said platform and including a switch spindle having an upper end portion formed with a slot and projecting through a hole in said supporting platform, said slot engaging said key means when said container is placed on said platform, said switch means adapted to connect and disconnect, respectively, said heating element when said switch spindle is turned by angular displacement of said container while said key means engage said slot; guide means guiding said container on said platform to a position in which said key means engage said slot in said switch spindle; and means locking said container to said platform when said switch spindle is turned to a position in which said switch means connect said heating element for energizing the same, said switch spindle being reversely turned, and said heating element disconnected while said container is being removed from said platform.

3. An electric heating device for liquids, comprising, in combination, a supporting platform; a portable container open on top and consisting of an electrically insulating material, said container having a bottom plate; a key means including a flat stem portion downwardly projecting from said bottom plate and a flat head portion laterally projecting beyond said stem portion; a locking plate mounted on said platform spaced a short distance therefrom and having a slot receiving said stem of said key means, the underside of said locking plate being engaged by said laterally projecting head portion of said key means when said key means is angularly displaced so as to prevent lifting of said container in angularly displaced position; a swivel bracket mounted on said supporting platform; an electric heating element downwardly projecting from said swivel bracket, said bracket being arranged at a level above said platform turnably from a position above the platform to a position projecting over the edge of said platform at which latter position said container may be raised toward said bracket so as to receive said heating element into the interior of said container whereupon said container with said heating element therein may be moved with a swivelling motion of said bracket onto said platform; switch means secured to said platform and including a switch spindle having an upper end portion formed with a slot and projecting through a hole in said supporting platform, said slot engaging said head portion of said key means when said container is placed on said platform, said switch means adapted to connect and disconnect, respectively, said heating element when said switch spindle is turned by angular displacement of said container while said key means engage said slot, said locking plate engaging said key means and locking said container to said platform when said switch spindle is turned to connect said heating element; and guide means guiding said container on said platform to a position in which said key means engage said slot in said switch spindle.

4. An electric heating device for liquids, comprising, in combination, a supporting platform; a portable container open on top and consisting of an electrically insulating material, said container having a bottom plate; a key means including a flat stem portion downwardly projecting from said bottom plate and a flat head portion laterally projecting beyond said stem portion; an elongated block mounted on said platform having a longitudinal slot extending around said upper end portion of said switch spindle and to an edge of said block, and permitting passing of head portion of said key means; a locking plate mounted on said block and having a narrow slot receiving said stem of said key means, the underside of said locking plate being engaged by said laterally projecting head portion of said key means when said key means is angularly displaced so as to prevent lifting of said container in angularly displaced position; a swivel bracket mounted on said supporting platform; an electric heating element downwardly projecting from said swivel bracket, said bracket being arranged at a level above said platform turnably from a position above the platform to a position projecting over the edge of said platform at which latter position said container may be raised toward said bracket so as to receive said heating element into the interior of said container whereupon said container with said heating element therein may be moved with a swivelling motion of said bracket onto said platform; switch means secured to said platform and including a switch spindle having an upper end portion formed with a slot and projecting through a hole in said supporting platform, said slot engaging said head portion of said key means when said container is placed on said platform, said switch means adapted to connect and disconnect, respectively, said heating element when said switch spindle is turned by angular displacement of said container while said key means engage said slot, said locking plate engaging said key means and locking said container to said platform when said switch spindle is turned to connect said heating element; and guide means downwardly projecting from the bottom plate of said container and engaging said block for guiding said container on said platform to a position in which said key means engage said slot in said switch spindle.

5. A device according to claim 1 and including a vertical tubular member upwardly projecting from said platform and supporting said swivel bracket; a swivel bearing axially adjustably supporting said tubular member; and electric connections connecting said heating element with said switch means passing through said tubular member.

RENÉ EUGÈNE LÉON TRUBERT.

REFERENCES CITED

The following references are of record in the file of this patent:

UNITED STATES PATENTS

| Number | Name | Date |
|---|---|---|
| 1,448,510 | Armstrong | Mar. 13, 1923 |
| 1,588,776 | Shoenberg et al. | June 15, 1926 |
| 1,637,155 | Marsden | July 26, 1927 |
| 1,680,743 | Leevers | Aug. 14, 1923 |
| 2,233,485 | Park | Mar. 4, 1941 |
| 2,266,090 | Smith | Dec. 16, 1941 |
| 2,269,689 | Reichold | Jan. 13, 1942 |